United States Patent
Poudrier

(10) Patent No.: US 10,981,588 B1
(45) Date of Patent: Apr. 20, 2021

(54) VERSATILE ARTICLE SUPPORT DEVICE

(71) Applicant: Alan S Poudrier, Niceville, FL (US)

(72) Inventor: Alan S Poudrier, Niceville, FL (US)

( * ) Notice: Subject to any disclaimer, the term of this patent is extended or adjusted under 35 U.S.C. 154(b) by 0 days.

(21) Appl. No.: 16/933,439

(22) Filed: Jul. 20, 2020

Related U.S. Application Data

(63) Continuation-in-part of application No. 16/537,593, filed on Aug. 11, 2019, which is a continuation-in-part of application No. 16/125,672, filed on Sep. 8, 2018, now Pat. No. 10,376,045, which is a continuation-in-part of application No. 15/962,262, filed on Apr. 25, 2018, now abandoned.

(51) Int. Cl.
| | |
|---|---|
| *B62B 3/02* | (2006.01) |
| *B65D 85/68* | (2006.01) |
| *B62B 3/00* | (2006.01) |
| *B62B 3/10* | (2006.01) |
| *B05B 13/02* | (2006.01) |
| *B62B 5/00* | (2006.01) |

(52) U.S. Cl.
CPC .......... *B62B 3/02* (2013.01); *B05B 13/0285* (2013.01); *B62B 3/008* (2013.01); *B62B 3/108* (2013.01); *B62B 5/0083* (2013.01)

(58) Field of Classification Search
CPC .......... B62B 3/02; B62B 3/108; B62B 3/008; B05B 13/0285
See application file for complete search history.

(56) References Cited

U.S. PATENT DOCUMENTS

| | | | | |
|---|---|---|---|---|
| 3,955,511 A | * | 5/1976 | Bak | A47B 45/00 108/137 |
| 4,637,626 A | * | 1/1987 | Foss | A45C 13/385 16/113.1 |
| 5,660,637 A | * | 8/1997 | Dodge | B05B 13/0285 118/500 |
| 5,720,817 A | * | 2/1998 | Taylor | B05B 13/0285 118/500 |
| 6,123,208 A | * | 9/2000 | Haenszel | A47B 45/00 108/55.1 |
| 6,488,304 B2 | * | 12/2002 | Krawczyk | B62B 1/002 280/408 |
| 6,561,745 B2 | * | 5/2003 | Rountree | B62B 1/10 280/47.27 |
| 6,811,038 B1 | * | 11/2004 | Sanderson | A47B 81/00 211/13.1 |
| 6,837,934 B1 | * | 1/2005 | Patrykus | B05B 13/0285 118/500 |
| 8,475,109 B2 | * | 7/2013 | Torrison | B62B 5/0485 414/444 |
| 9,623,889 B2 | * | 4/2017 | Wallace-Riley | B62B 3/004 |
| 9,903,527 B1 | * | 2/2018 | Wiborg | F16M 11/20 |
| 10,376,045 B1 | * | 8/2019 | Poudrier | B62B 3/002 |

(Continued)

*Primary Examiner* — Kimberley S Wright
(74) *Attorney, Agent, or Firm* — Peter Loffler

(57) ABSTRACT

A versatile transport rack uses a pair of end frames that are each pivotally attached to a connector frame on opposing sides thereof thereby forming an article support device. Each frame has casters removably attached thereto. One or more vertical frames and/or one or more relatively flat base plates are removably attached to an upper surface of the versatile transport rack. Hinge pin receiver pairs are attached to the vertical frame and receive door pin pairs of a vehicle door.

19 Claims, 5 Drawing Sheets

(56) References Cited

U.S. PATENT DOCUMENTS

| | | | |
|---|---|---|---|
| 2004/0150148 A1* | 8/2004 | Luca | B62D 65/18 269/17 |
| 2005/0011135 A1* | 1/2005 | Hallberg | E04H 3/28 52/7 |
| 2008/0087792 A1* | 4/2008 | Evitt, Sr. | F16M 3/00 248/676 |
| 2008/0237168 A1* | 10/2008 | Harpole | B65D 19/12 211/195 |
| 2014/0217045 A1* | 8/2014 | Nesin | A47F 7/00 211/85.8 |
| 2015/0118006 A1* | 4/2015 | Wallace-Riley | B62B 3/005 414/800 |
| 2019/0331291 A1* | 10/2019 | Poudrier | B25H 1/0007 |
| 2020/0290521 A1* | 9/2020 | Stump, II | B60R 9/06 |

\* cited by examiner

VERSATILE ARTICLE SUPPORT DEVICE

This application is a Continuation-In-Part of U.S. patent application Ser. No. 16/537,593, filed on Aug. 11, 2019, which is a Continuation-In-Part of U.S. patent application Ser. No. 16/125,672, filed on Sep. 8, 2018, now U.S. Pat. No. 10,376,045, which is a Continuation-In-Part of U.S. patent application Ser. No. 15/964,264, filed on Apr. 25, 2018, now abandoned, each of which is incorporated by reference herein in its entirety.

BACKGROUND OF THE INVENTION

1. Field of the Invention

The present invention relates to a ground supported rack that rests on the ground surface or rolls on casters, the rack having a vertical support so that the rack can hold various items supported by either its horizontal base or the vertical support, or both, the rack also having horizontally placed base plates, without or without the rack for additional cargo capacity including being usable as a creeper.

2. Background of the Prior Art

Many people who enjoy outdoor activities own sport utility vehicles (SUVs) with doors that can be removed in order to give occupants more outdoor pleasure while riding in the vehicle. The doors, once removed, need to be stored in appropriate fashion in order to prevent damage to them. As such doors are relatively bulky and heavy, such storage is not an easy task. Laying the doors on a ground surface is not satisfactory as that can cause damage to the door, especially to its finish. Therefore, some devices are available for storing the doors, but such devices do not offer any purpose beyond this singular purpose and are not otherwise of particular utility when not serving in their intended purpose and are they themselves relatively large and bulky.

What is needed is a device that is designed to easily and effectively hold a vehicle door that is removed from the vehicle so as to prevent the door from becoming damaged. Such a device must be able to easily move about the ground level when the doors are being held by the device. Such a device must have substantial utility beyond the task of holding and moving vehicle doors about so that the device is multipurpose in its functioning. Such a device must provide support for a variety of articles as defined by the users' needs and also be relatively small and compact when not in use for ease of storage or transport of the device.

SUMMARY OF THE INVENTION

The versatile article support device of the present invention addresses the aforementioned needs in the device by providing an article rack that is specifically configured to hold a set of vehicles doors that are removed from a vehicle and easily move the doors about a ground surface as needed. The versatile article support device allows for quick and easy donning of the doors onto the device and doffing therefrom without the need for any specialized tools or other implements. The versatile article support device has substantial versatility beyond its door storing and transport function and can be quickly configured for a wide variety of diverse tasks including being used as a creeper and being used to transport large, heavy or bulky items. The versatile article support device is of relatively simple design and construction, being produced using standard manufacturing techniques, so that the device is relatively inexpensive to produce so as to be economically attractive to potential consumers for this type of device. Use and maintenance of the versatile article support device is simple and straightforward. The versatile article support device is lightweight and compact in design and is collapsible for ease of storage and transport of the device. The device folds up for ease of transport and storage.

The versatile article support device of the present invention is comprised of a first end frame that has a pair of first casters removably attached to a first lower surface thereof. A connector frame is attached to the end frame at a first end of the connector frame forming an article support device. At least one pair of second casters is removably attached to a second lower surface of the connector frame. Either a base plate or a vertical frame is attached to an upper surface of the article support device. The vertical frame has an upwardly extending first riser rail that extends upwardly from a base rail and a second riser rail that extends upwardly from the base rail coextensively with the first riser rail. The base rail is attached to the upper surface of the horizontal frame. The vertical frame also has a top rail that joins the first riser rail and the second riser rail. A first of hinge pin receiver has a first opening and an optional second opening and is attached to the first riser rail such that the first riser rail is located between the first opening and the second opening. A second of hinge pin receiver has a third opening and an optional fourth opening and is attached to the first riser rail, below the first hinge pin receiver. The first opening of the first hinge pin receiver and the third opening of the second hinge pin receiver align with one another so that a first axis passes longitudinally through the aligned first opening and the third opening, the first axis also parallel with the pair of risers. The second opening of the first hinge pin receiver and the fourth opening of the second hinge pin receiver align with one another so that a second axis passes longitudinally through the aligned second opening and the fourth opening, the second axis also parallel with the pair of risers. A third of hinge pin receiver has a fifth opening and an optional sixth opening and is attached to the second riser rail such that the second riser rail is located between the fifth opening and the sixth opening. A fourth of hinge pin receiver has a seventh opening and an optional eighth opening and is attached to the second riser rail, below the third hinge pin receiver. The fifth opening of the third hinge pin receiver and the seventh opening of the fourth hinge pin receiver align with one another so that a third axis passes longitudinally through the aligned fifth opening and the seventh opening, the third axis also parallel with the pair of risers. The sixth opening of the third hinge pin receiver and the eight opening of the fourth hinge pin receiver align with one another so that a fourth axis passes longitudinally through the aligned sixth opening and the eighth opening, the fourth axis also parallel with the pair of risers. A second end frame is attached to a second end of the connector frame and has a pair of third casters removably attached to a third lower surface thereof. The first end frame is pivotally attached to the connector frame and the second end frame is also pivotally attached to the connector frame.

BRIEF DESCRIPTION OF THE DRAWINGS

Similar reference numerals refer to similar parts throughout the several views of the drawings.

DESCRIPTION OF THE PREFERRED EMBODIMENT

Figure 1:
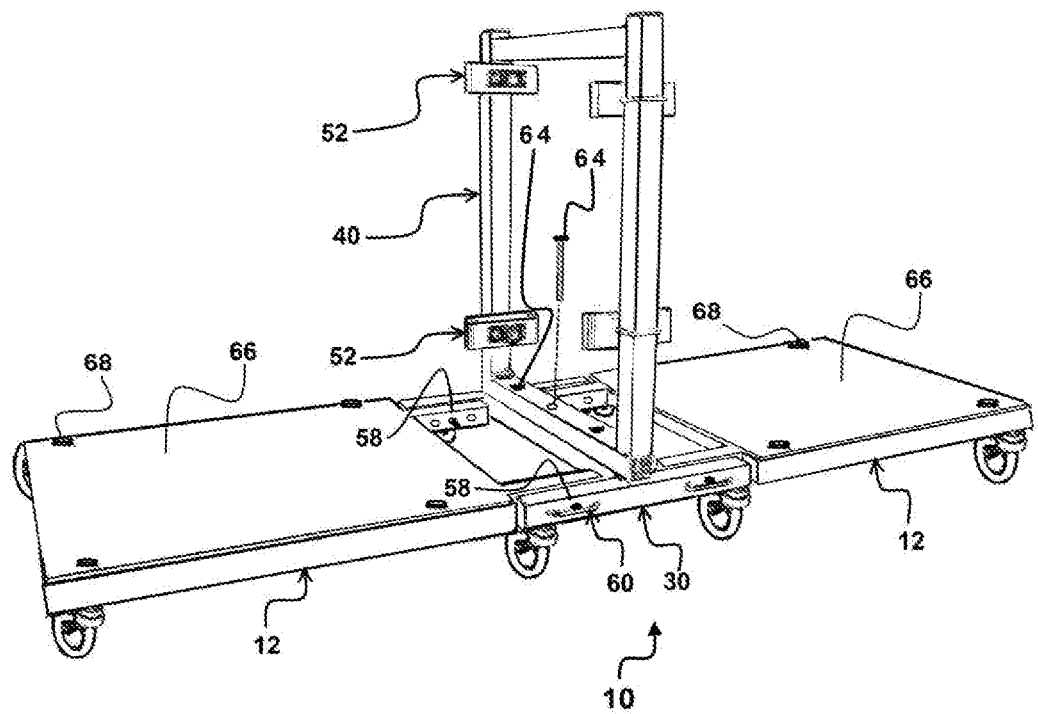
FIG. 1 is a perspective view of the versatile article support device of the present invention.

Referring now to the drawings, it is seen that the versatile article support device of the present invention, generally denoted by reference numeral 10, is comprised of a pair of substantially identical generally rectangular end frames 12, Each end frame 12 has a pair of coextensive side rails 14 joined by an end rail 16 and at least one first cross rail 18. A pair of coextensive inner connector arms 20 extend outwardly from the first cross rail 18, The various components 12, 14, 16, 18 and 20 are each made from an appropriate material such as tubular stock (metal, plastic, etc.,) and are attached to each other in any appropriate manner such as via welding (or possibly made as a unitary item), or the end frame can be formed as a single unit appropriate bent into the shape show, albeit with the first cross rail 18 not part of such a configuration. Vertically extending first top openings 22 are located along the end rail 16 and the first cross rail 18 if so configured. Additional second top openings 24 may be located along the side rails 14. Horizontally extending first side openings 26 are located along each inner connector arm 20. At least one pair of casters 28 or similar type of wheel set is removably attached to a lower surface of the end frame 12.

A connector frame 30 has a pair of outer connector arms 32 joined by a centrally disposed second cross rail 34. The outer connector arms 32 and the second cross rail 34 are each made from an appropriate material such as tubular stock (metal, plastic, etc.,) and are attached to each other in any appropriate manner such as via welding (or possibly made as a unitary item). Vertically extending third top openings 36 are located along the second cross rail 34. Horizontally extending second side openings 38 are located along each outer connector arm 32. At least one pair of casters 28 is removably attached to a lower surface of the connector frame 30.

A generally rectangular-shaped vertical frame 40 has a base rail 42 from which a pair of riser rails 44 extend upwardly from either end thereof, in spaced apart and parallel fashion. A top rail 46 connects the upper ends of the two riser rails 44. The various rails 42, 44 and 46 are made from the same or similar material used to make the components of the end frame 12 and are connected to one another at their respective locations in any appropriate manner. Vertically extending fourth top openings 48 are located along the base rail 42. Horizontally extending third openings 50 may be located along each riser rail 44. As seen, a pair of hinge pin receives 52 is attached to at least one or possibly both of the riser rails 44 in any appropriate fashion (such as via the illustrated brackets 54). As seen, each hinge pin receiver 52 is a body member that has a pin opening 56 therethrough on one or both ends of the body member. When a pair of the hinge pin receivers 52 is attached to one of the riser rails 44, the hinge pin receivers 52 align with one another and the pin openings 56 likewise axially align with one another and face in a vertical orientation when attached to the end frame 12 as discussed below. The aligned pin openings 56 receive a pair of door pins from a door D of a vehicle V in order to hold the door D thereby. The hinge pin receivers 52 are height adjustable on the riser rails 44 of the vertical frame 40. For each hinge pin receiver, the pin openings need only be on one side of the risers.

In order to assemble the versatile article support device 10, an end frame 12 is positioned with respect to the connector frame 30 so that the inner connector arms 20 of the end frame 12 coextend with the outer connector arms 32 of the connector frame 30. In this position, each of the first side openings 26 of each inner connector arm 20 align with the corresponding second side openings 38 of the outer connector arm 32 with which the particular inner connector arm 20 abuts. A pivot pin 58 is inserted through one of the aligned first side opening—second side opening pair on each side of the device while a connector pin(s) 60 is inserted through the remaining aligned first opening—second opening pair and the connector pin 60 is secured at its distal end such as via the illustrated threaded nuts. The connector pin 60 may be the illustrated U-shaped pin for ease of installation, however two individual pins (not illustrated) can be used instead. Additionally, the connector pin 60 is shown as straddling the pivot pin 58, however, the pivot pin 58 and the connector pin 60 can be installed in side by side fashion. The other end frame 12 is attached to the opposite side of the connector frame 30 in similar fashion, although the device can be utilized with only one end frame 12 attached to the connector frame 30 thereby forming an article support device 62.

The vertical frame 40 is attached to the connector frame 30 by positioning the vertical frame 40 on the upper surface of the connector frame 30 such that the base rail 42 sits atop one of the second cross rails 34 and a portion of the outer connector arms 32 of the connector frame 30. In this position, the third top openings 36 on the second cross rail 34 each align with a respective one of the fourth top openings 48 on the base rail 42. Appropriate bolts 64 or similar implements are passed through each aligned third top opening—fourth top opening pair and secured as appropriate (securement not illustrated). The vertical frame 40 is now secured to the article support device 62. Alternately or in addition the vertical frame 40 can be attached to one of the end rails 16 of the end frame 12 as more than one vertical frame 40 can be attached to the article support device 62. Each hinge pin receiver 52 is height adjusted along its riser rail 44. A vehicle door D is attached to the versatile article support device 10 by inserting the two door pins (not illustrated) of the door D into a pair of aligned pin openings 56 of a pair of aligned hinge pin receivers 52. Additional doors may be similarly attached. Of course, other items can be inserted into the pin openings 56, such as the illustrated mirrors M, so long as the pin opening 56 is sufficient large to accommodate the particular item.

Figure 2:
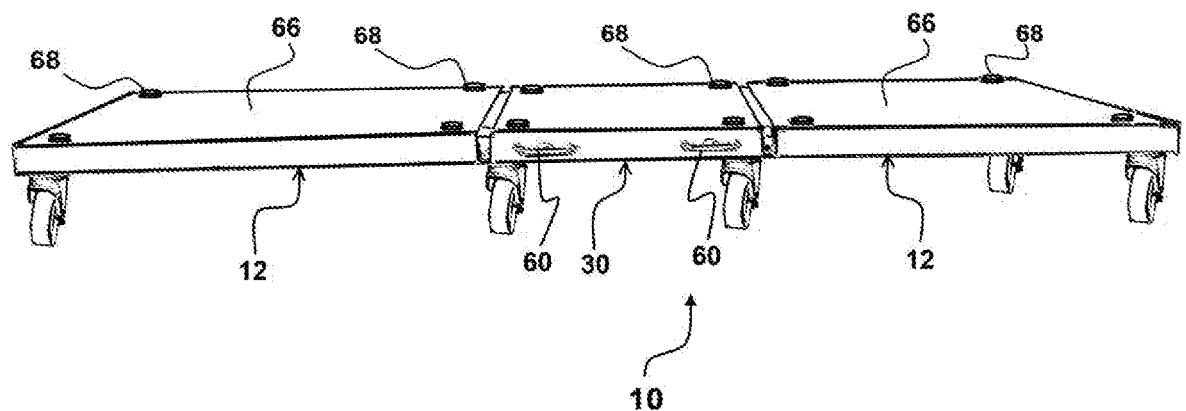
FIG. 2 is a perspective view of the versatile article support device configured as a creeper.
Figure 3:
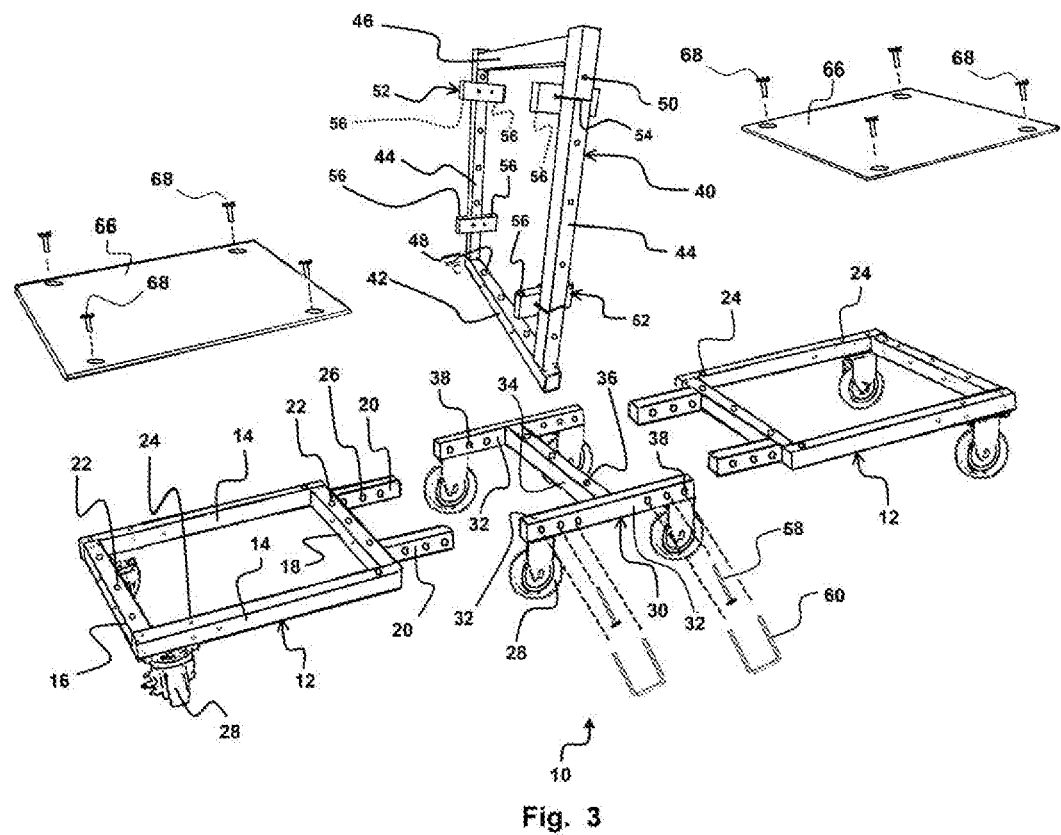
FIG. 3 is an exploded perspective view of the versatile article support device.
Figure 4:
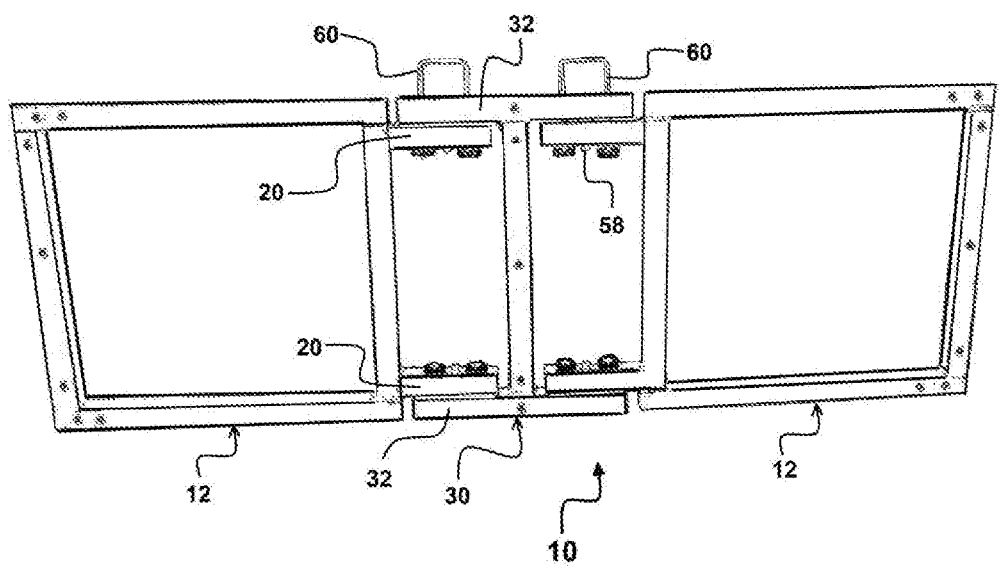
FIG. 4 is a top view of the versatile article support device utilizing with the vertical frame removed.
Figure 5:
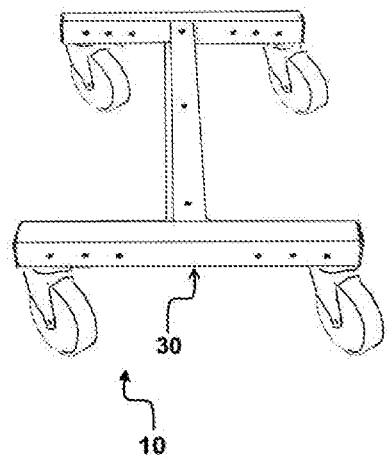
FIG. 5 is a perspective view of the connector frame of the versatile article support device.
Figure 8:
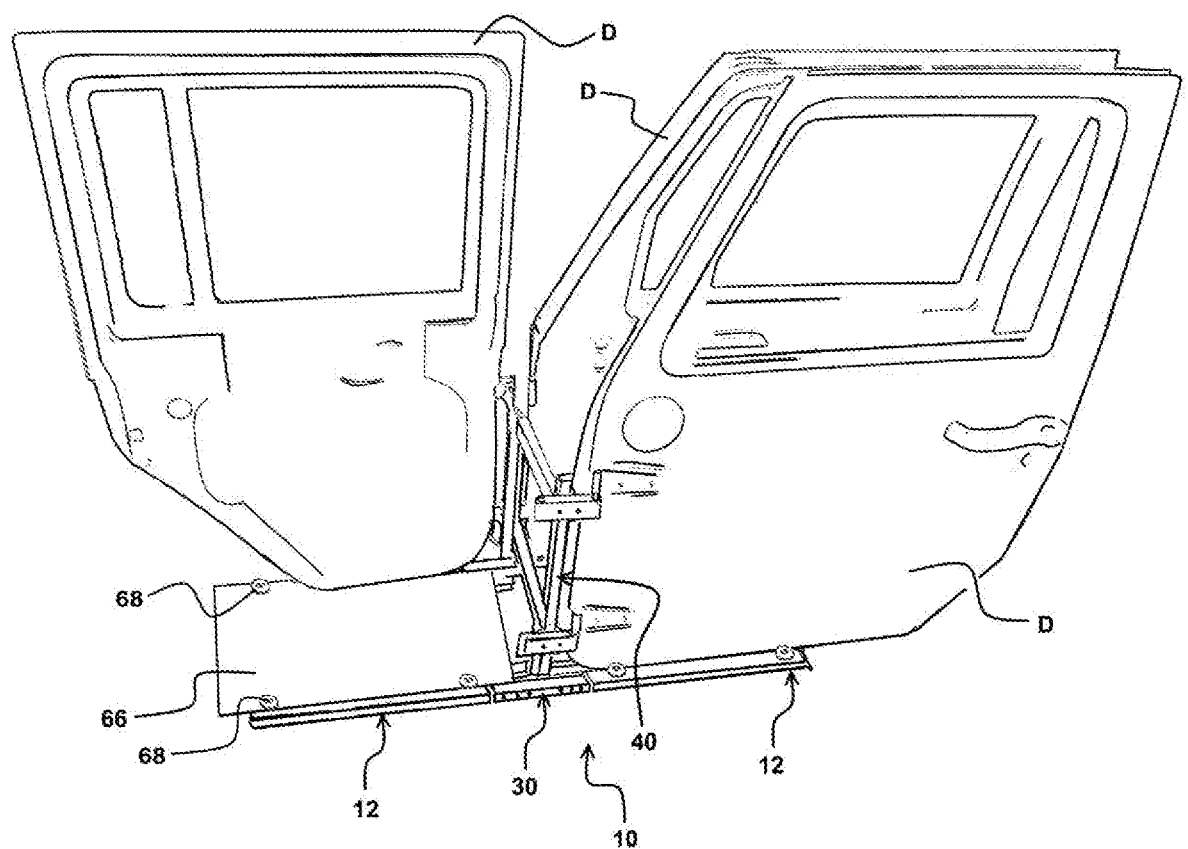
FIG. 8 is an environmental view of the versatile article support device holding vehicle doors and being on a ground surface without casters.
Figure 9:
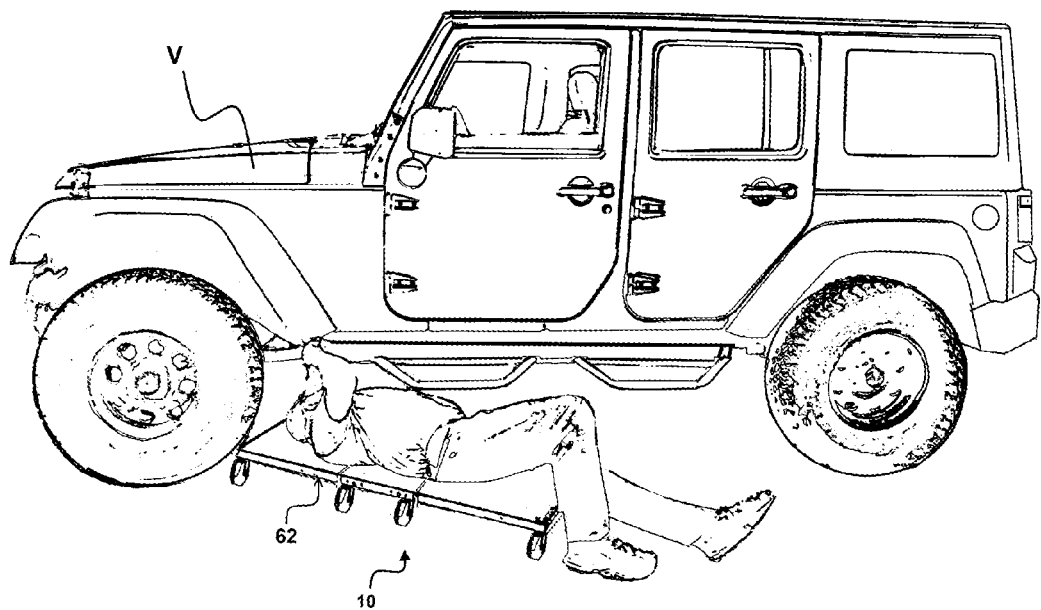
FIG. 9 is an environmental view of the versatile article support device being used as a creeper.

One or more base plates 66 can be attached to the article support device 62 by passing bolts 68 or similar implements through openings (not illustrated) on the base plate 66 and corresponding openings (the first top openings 22 and/or second top openings 24) of the article support device 62, the particular top openings used being dependent on where the base plate 66 is to be positioned. The base plate 66 can be positioned so it abuts a second base plate 66 attached to the article support device 62 so that the two base plates 66 form a generally continuous top surface for the article support device 62 allowing the article support device 62 to be used cargo carrier or as a creeper as illustrated in FIGS. 2 and 9, or the base plates 66 can be offset from one another to allow extra surface area whenever the middle portion of the article support device 62 is covered by vehicle doors D, as illustrated in FIG. 8. Advantageously, the bolts 68 used to attach the base plate 66 to the article support device are inset so that the bolt's top is generally flush with the upper surface of the base plate 66.

Figure 10:
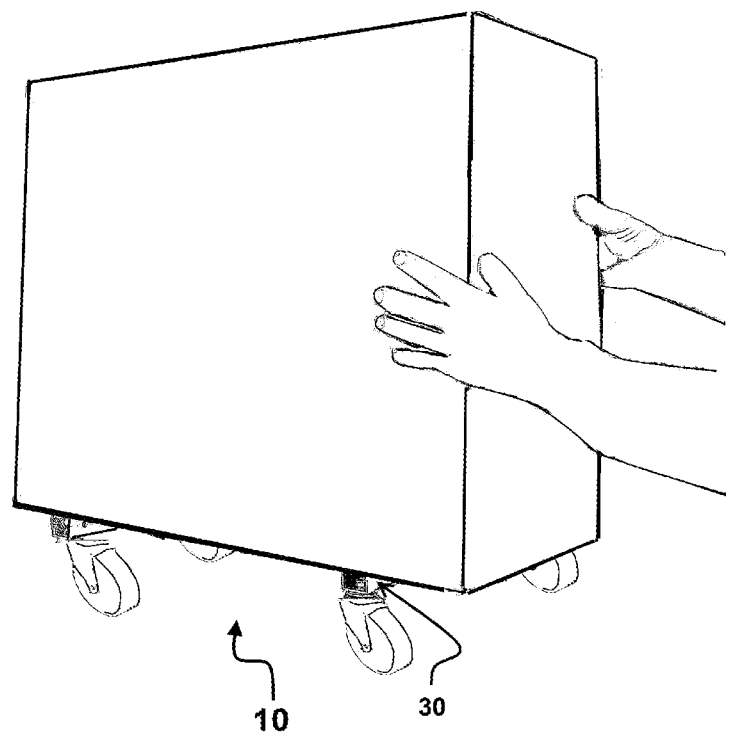
FIG. 10 is an environmental view of the connector frame of the versatile article support device transporting an item of cargo.

As seen in FIG. 10, the connector frame 30, by also having removable casters 28, can be used to transport large, bulky or heavy items with ease.

Figure 6:
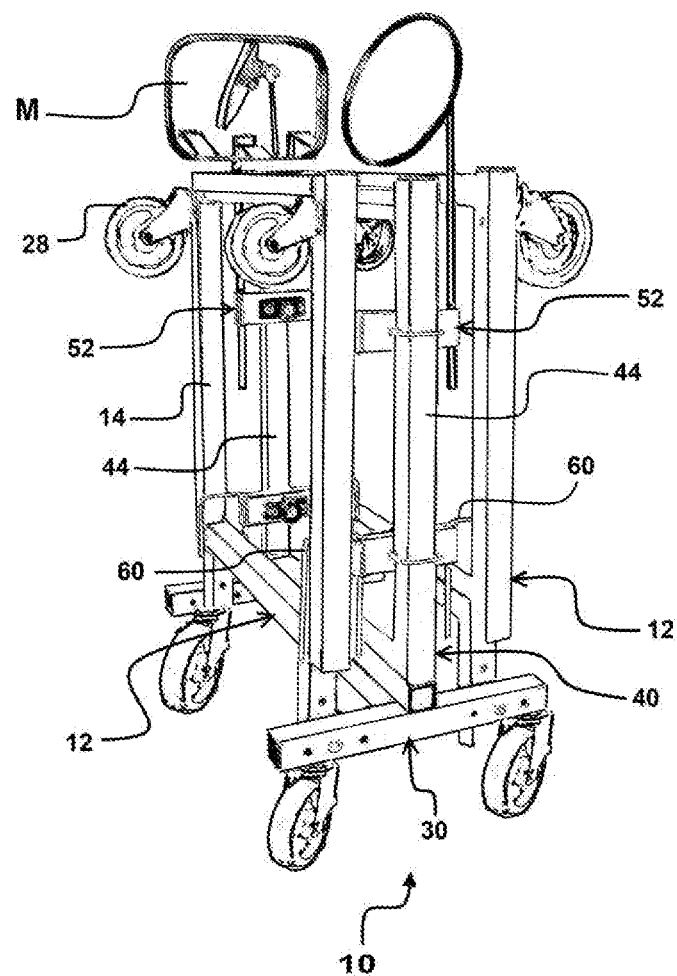
FIG. 6 is a perspective view of the versatile article support device in a folded configuration.
Figure 7:
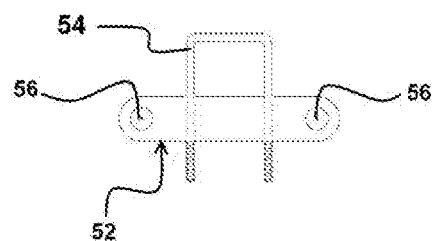
FIG. 7 is a top view of the connecting bolt used with the versatile article support device.

As seen in FIG. 6, the versatile article support device 10 can be folded up for ease of transport and storage. This is accomplished by removing the connector pins 60 from the end frames 12 and the connector frame 30 and pivoting each end frame 12 about the pivot pin 58. Once each end frame 12 is pivoted as desired, an appropriate device, such as a series of latches, bungee cords, etc., (none illustrated) can be used to secure the device in the folded configuration.

While the invention has been particularly shown and described with reference to an embodiment thereof, it will be appreciated by those skilled in the art that various changes in form and detail may be made without departing from the spirit and scope of the invention.

I claim:

1. A versatile article support device comprising:
    a first end frame, having an end rail and a first cross rail joined by a pair of side rails, the first end frame also having a pair of coextensive extensions extending outwardly from the first cross rail;
    a pair of first casters removably attached to a first lower surface of the first end frame;
    a connector frame, having a pair of coextensive connector arms joined by a second cross rail, the connector frame attached to the end frame by attaching each of the outer connector arms to a respective one of the extensions forming an article support device, such that the end rail, the first cross rail, the second cross rail, the pair of extensions and the connector arms are all on the same plane;
    a pair of second casters removably attached to a second lower surface of the connector frame;
    a vertical frame having an upwardly extending first riser rail extending upwardly from a base rail and a second riser rail extending upwardly from the base rail coextensively with the first riser rail, such that the base rail is directly attached to either the cross rail or the second cross rail, the vertical frame also having a top rail that joins the first riser rail and the second riser rail, the vertical frame attached to the article support device;
    a first hinge pin receiver having a first opening and a second opening, the first hinge pin receiver attached to the first riser rail such that the first riser rail is located between the first opening and the second opening; and
    a second of hinge pin receiver having a third opening and an fourth opening, the second hinge pin receiver attached to the first riser rail below the first hinge pin receiver, such that the first opening of the first hinge pin receiver and the third opening of the second hinge pin receiver align with one another so that a first axis passes longitudinally through the aligned first opening and the third opening, the first axis also parallel with the pair of risers, and such that the second opening of the first hinge pin receiver and the fourth opening of the second hinge pin receiver align with one another so that a second axis passes longitudinally through the aligned second opening and the fourth opening, the second axis also parallel with the pair of risers.

2. The versatile article support device as in claim 1 further comprising;
    a third of hinge pin receiver having a fifth opening and a sixth opening, the third hinge pin receiver attached to the second riser rail such that the second riser rail is located between the fifth opening and the sixth opening; and
    a fourth of hinge pin receiver having a seventh opening and an eighth opening, the fourth hinge pin receiver attached to the second riser rail below the third hinge pin receiver, such that the fifth opening of the third hinge pin receiver and the seventh opening of the fourth hinge pin receiver align with one another so that a third axis passes longitudinally through the aligned fifth opening and the seventh opening, the third axis also parallel with the pair of risers, and such that the sixth opening of the third hinge pin receiver and the eight opening of the fourth hinge pin receiver align with one another so that a fourth axis passes longitudinally through the aligned sixth opening and the eighth opening, the fourth axis also parallel with the pair of risers.

3. The versatile article support device as in claim 1 wherein the first end frame is pivotally attached to the connector frame.

4. The versatile article support device as in claim 1 further comprising:
    a second end frame attached to a second end of the connector frame; and
    a pair of third casters removably attached to a third lower surface of the second end frame.

5. The versatile article support device as in claim 4 wherein the first end frame is pivotally attached to the connector frame and the second end frame is pivotally attached to the connector frame.

6. The versatile article support device as in claim 1 further comprising a base plate attached to an upper surface of the article support device.

7. A versatile article support device comprising:
    a first end frame, having a end rail and a cross rail joined by a pair of first side rails, the first end frame also having a pair of coextensive extensions extending outwardly from the first cross rail;
    a connector frame, having a pair of coextensive outer connector arms joined by a second cross rail, the connector frame attached to the end frame by attaching each of the outer connector arms to a respective one of the extensions forming an article support device, such that the end rail, the first cross rail, the second cross rail, the pair of extensions and the connector arms are all on the same plane;
    a base plate;
    a vertical frame having an upwardly extending first riser rail extending upwardly from a base rail and a second riser rail extending upwardly from the base rail coextensively with the first riser rail, the vertical frame also having a top rail that joins the first riser rail and the second riser rail;

a first hinge pin receiver having a first opening and a second opening, the first hinge pin receiver attached to the first riser rail such that the first riser rail is located between the first opening and the second opening;

a second of hinge pin receiver having a third opening and an fourth opening, the second hinge pin receiver attached to the first riser rail below the first hinge pin receiver, such that the first opening of the first hinge pin receiver and the third opening of the second hinge pin receiver align with one another so that a first axis passes longitudinally through the aligned first opening and the third opening, the first axis also parallel with the pair of risers, and such that the second opening of the first hinge pin receiver and the fourth opening of the second hinge pin receiver align with one another so that a second axis passes longitudinally through the aligned second opening and the fourth opening, the second axis also parallel with the pair of risers; and wherein the base plate and the vertical frame are interchangeably attached to an upper surface of the article support device, the vertical frame being attached to the article support device via the base rail attached to either the first cross rail or the second cross rail and the base plate attached directly to each of the pair of cross rails or to the end rail or to the cross rail.

8. The versatile article support device as in claim 7 further comprising;
   a pair of first casters removably attached to a first lower surface of the first end frame; and
   a pair of second casters removably attached to a second lower surface of the connector frame.

9. The versatile article support device as in claim 7 further comprising:
   a third of hinge pin receiver having a fifth opening and a sixth opening, the third hinge pin receiver attached to the second riser rail such that the second riser rail is located between the fifth opening and the sixth opening; and
   a fourth of hinge pin receiver having a seventh opening and an eighth opening, the fourth hinge pin receiver attached to the second riser rail below the third hinge pin receiver, such that the fifth opening of the third hinge pin receiver and the seventh opening of the fourth hinge pin receiver align with one another so that a third axis passes longitudinally through the aligned fifth opening and the seventh opening, the third axis also parallel with the pair of risers, and such that the sixth opening of the third hinge pin receiver and the eight opening of the fourth hinge pin receiver align with one another so that a fourth axis passes longitudinally through the aligned sixth opening and the eighth opening, the fourth axis also parallel with the pair of risers.

10. The versatile article support device as in claim 7 wherein the first end frame is pivotally attached to the connector frame.

11. The versatile article support device as in claim 7 further comprising:
    a second end frame attached to a second end of the connector frame; and
    a pair of third casters attached to a third lower surface of the second end frame.

12. The versatile article support device as in claim 11 wherein the first end frame is pivotally attached to the connector frame and the second end frame is pivotally attached to the connector frame.

13. The rack as in claim 7 further comprising a base plate attached to an upper surface of the article support device.

14. A versatile article support device comprising:
    a first end frame, having a end rail and a cross rail joined by a pair of first side rails, the first end frame also having a pair of coextensive extensions extending outwardly from the first cross rail;
    a pair of first casters attached to a first lower surface of the first end frame;
    a connector frame, having a pair of coextensive outer connector arms joined by a second cross rail, the connector frame attached to the end frame by attaching each of the outer connector arms to a respective one of the extensions forming an article support device, such that the end rail, the first cross rail, the second cross rail, the pair of extensions and the connector arms are all on the same plane;
    a pair of second casters removably attached to a second lower surface of the connector frame;
    a an vertical frame having an upwardly extending first riser rail extending upwardly from a base rail and a second riser rail extending upwardly from the base rail coextensively with the first riser rail, such that the base rail is directly attached to either the cross rail or the second cross rail, the vertical frame also having a top rail that joins the first riser rail and the second riser rail, the vertical frame attached to the article support device;
    a first hinge pin receiver having a first opening, the first hinge pin receiver attached to the first riser rail; and
    a second of hinge pin receiver having a second opening, the second hinge pin receiver attached to the first riser rail below the first hinge pin receiver, such that the first opening of the first hinge pin receiver and the second opening of the second hinge pin receiver align with one another so that a first axis passes longitudinally through the aligned first opening and the second opening, the first axis also parallel with the pair of risers.

15. The versatile article support device as in claim 14 further comprising;
    a third of hinge pin receiver having a third opening, the third hinge pin receiver attached to the second riser rail; and
    a fourth of hinge pin receiver having a fourth opening, the fourth hinge pin receiver attached to the second riser rail, below the third hinge pin receiver, such that the third opening of the third hinge pin receiver and the fourth opening of the fourth hinge pin receiver align with one another so that a second axis passes longitudinally through the aligned third opening and the fourth opening, the third axis also parallel with the pair of risers.

16. The versatile article support device as in claim 14 wherein the first end frame is pivotally attached to the connector frame.

17. The versatile article support device as in claim 14 further comprising:
    a second end frame attached to a second end of the connector frame; and
    a pair of third casters removably attached to a third lower surface of the second end frame.

18. The versatile article support device as in claim 17 wherein the first end frame is pivotally attached to the connector frame and the second end frame is pivotally attached to the connector frame.

19. The versatile article support device as in claim 14 further comprising a base plate attached to an upper surface of the article support device.

\* \* \* \* \*